United States Patent Office 3,464,959
Patented Sept. 2, 1969

3,464,959
OLEFINIC AMORPHOUS CURABLE TERPOLY-
MERS OF ALPHA-OLEFINS AND POLYCYCLIC
ORTHOCONDENSED POLYENES HAVING ONE
OR MORE CONJUGATED ALKYLIDENE SUB-
STITUENTS AND PROCESS FOR THE PRODUC-
TION THEREOF
Walter Marconi, Sebastiano Cesca, and Arnaldo Roggero,
San Donato Milanese, Italy, assignors to Snam S.p.A.,
Milan, Italy, a company of Italy
No Drawing. Filed Aug. 10, 1965, Ser. No. 478,755
Claims priority, application Italy, Sept. 30, 1964,
51,807/64
Int. Cl. C08f 1/34, 1/08, 3/16
U.S. Cl. 260—79.5                                11 Claims

ABSTRACT OF THE DISCLOSURE

A vulcanizable amorphous terpolymer is produced by blowing a gaseous mixture of ethylene and propylene into a solvent, such as n-heptane, then charging the reactor with an orthocondensed polycyclic polyene, such as 1-isopropylidene-4, 7, 7a, 3a-tetrahydroindene, containing an alkylidene substituent conjugated with a double bond which is part of the cyclic ring, the reaction being effected in the presence of a catalytic system consisting of a derivative of a transition metal of the IV or V Group of the Periodic Table and of an aluminum compound having the general formula Al—R—X—Y, where R is an alkyl radical of from 1 to 12 carbon atoms or a hydrogen atom, and X and Y can be hydrogen, an alkyl radical of from 1 to 12 carbon atoms, a halogen, or a residue of a secondary amine.

---

This invention relates to a novel class of curable amorphous terpolymers consisting of ethylene, alpha olefins and orthocondensed polycyclic polyenes substituted with an alkylidene type grouping whose double bond is conjugated with at least a double bond of one of the cyclic rings.

It is known to prepare terpolymers starting from olefins and diolefins so as to obtain polymers which, on the one hand, afford the stability advantages proper to the polyolefins, and which, on the other hand, on account of the presence of the double bonds, can be cured with the methods conventionally used for the natural rubbers.

Not all the diolefins, however, can be used as the monomers with ethylene and propylene, since a few of them show a tendency towards the formation of chains containing "blocks" of a homopolymeric nature, so that the distribution of the double bonds is uneven throughout the whole terpolymer. Other diolefins have, conversely, a very low reactivity and, in practice, they do not take part in the polymerization reaction while still other diolefins would end to inhibit the polymerization reaction.

The diolefins which show a tendency towards inhibiting the polymerization reaction are, generally, the conjugated diolefins, it being known, in fact, that it is difficult to obtain terpolymers having saisfactory properties whenever a conjugated diolefin, such as butadiene, isoprene and the like is used as the third monomer. We have found a novel class of terpolymer which, upon curing, give products having very good mechanical properties by employing as the third monomer a particular polyene having at least two conjugated double bonds.

These particular polyenes are those belonging to the class of the orthocondensed polycyclic polyenes substituted with alkylidene groupings conjugated with the double bonds of the cyclic rings.

Examples of third monomers which can be employed are:

1-isopropylidene-4,7,7a,3a-tetrahydroindene

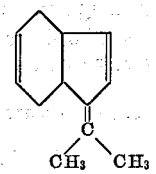

1(1'phenyl)ethylidene-4,7,7a,3a-tetrahydroindene

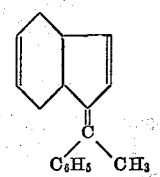

1-isopropylidene-bicyclo-(4.4.0)-decadiene-2,6

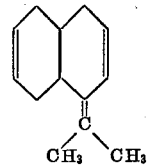

2-isopropylidene-bicyclo-(4.4.0)-decadiene-3,6

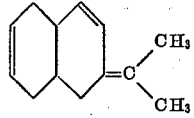

1-isopropylidene-4-methyl-bicyclo-(4.3.0)-nonadiene-2,5

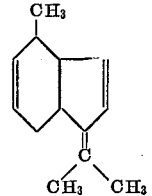

3-isopropylidene-8-methyl-bicyclo-(4.4.0)-decadiene-4,6

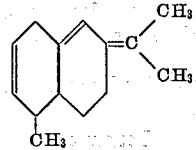

and the like.

A few of these compounds can be readily obtained by a Diels-Alder reaction of fulvenes, or 3-isopropylidenecyclohexadiene-1,4 or their alkyl substituted derivatives with conjugated polyenes such as butadiene, 2,3-dimethylbutadiene, isoprene, piperylene, 1,3-hexadiene and the like. It is moreover possible to employ as the third monomer the reaction mixture of the Diels-Alder reaction comprising, besides the products aforementioned, also the dimers of the polyenes and the dimers of the alkylidenecycloalkenes.

The two olefins which, with the polyene, form the terpolymer are selected among alpha-mono-olefins having from 2 to 6 carbon atoms and, more particularly, are ethylene and propylene.

For the polymerization there have been employed catalyst systems of the co-ordinated anion type, formed by a derivative of the transition metal of the IV and of the V Group of the Periodic Table and derivatives of aluminum selected in the following classes: the first class comprises the compounds having the general formula Al—R—X—Y wherein R is an alkyl radical having from 1 to 12 carbon atoms or a hydrogen atom, X and Y, equal or different, can be hydrogen, alkyl radicals having from 1 to 12 atoms of carbon, halogens or derivatives of secondary amines. Another class is formed by compounds having the general formula Me—Al—R$_4$ wherein Me is an alkali metal and R has the meaning indicated above.

These compounds can also be formed into complexes with Lewis' bases.

Examples of these compounds are:

Al(n-C$_{10}$H$_{21}$)$_3$        Al(n-C$_6$H$_{13}$)$_3$
Al(i-C$_4$H$_9$)$_3$              AlCl$_2$(C$_2$H$_5$)
Al(C$_2$H$_5$)$_2$Cl              Al(i-C$_4$H$_9$)$_2$Cl
Al(i-C$_4$H$_9$)Cl$_2$            AlHCl$_2$.O(C$_2$H$_5$)$_2$
AlH$_2$N(CH$_3$)$_2$              AlHClN(CH$_3$)$_2$
AlH$_3$.N(CH$_3$)$_3$             LiAl(n-C$_8$H$_{17}$)$_4$

Examples of compounds of transition metals are: VCl$_4$, VOCl$_3$, vanadium triacetylacetonate, VClO(OC$_2$H$_5$)$_2$, VCl$_3$.3THF (THF=tetrahydrofuran), TiCl$_4$ and the like.

The terpolymers thus obtained, once they have been cured ("gum stock") exhibit outstanding mechanical properties such as for example:

Modulus at 100% elongation ranging from 10 to 25 kgs./sq. cm.
Tensile strength ranging from 20 to 50 kgs./sq. cm.
Elongation at break ranging from 250 to 750%.
Permanent set after break not higher than 20%.

The satisfactory properties which have been observed are indicative of an even distribution of the double bonds throughout the chain. On the other hand the analysis of the contents of double bonds in the polymer, measured with infrared radiations, exhibits a percentage of polyenes ranging from 1 to 10%.

It is also possible to obtain higher percentages of unsaturations but this, obviously, renders the polymer less economical.

The polymerization temperature is between —30° C. and +40° C. and the working pressures are between 1 and 50 atmospheres. The reaction can be carried out, but this is in no way compulsory, in solvents which generally are selected among aromatic, aliphatic and cycloaliphatic hydrocarbons and also saturated or unsaturated chlorinated hydrocarbons.

The procedure for recovering the polymer and also the compound formulations are those usually employed in the art.

The following examples illustrate the invention without however limiting it.

Example 1

An 800-mls. glass reactor is charged, under a nitrogen stream, with 400 mls. of anhydrous n-heptane. The apparatus is fitted with an efficient stirring device, dropping funnel and sheathed thermometer and is placed on a thermostatic bath at 0° C., being maintained at this temperature throughout the whole polymerization time.

In the n-heptane a gaseous mixture of ethylene and propylene is blown, having a molar ratio of propylene to ethylene of 2.5 to 1, with a rate of flow of 200 normal liters an hour, for a period of about 30 mins. In order that the saturation equilibrium may be easily attained, the solvent is vigorously stirred and the gaseous mixture is brought through the bottom of the reactor, which is suitably dimensioned so as to afford a quick dispersion of the gas into n-heptane. The reactor is now charged with 15 millimoles per liter of Al(n-C$_{10}$H$_{21}$)$_3$, while keeping the solvent vigorously stirred: then, 0.117 mole per liter of 1-isopropylidene-4,7,7a,3a-tetrahydroindene are introduced.

The terpolymerization reaction is primed by further introducing into the reactor 5 millimoles per liter of VCl$_4$, while, at the same time, continually blowing into the catalyst solution a gaseous stream of ethylene and propylene having the initial composition and rate of flow.

The polymerization is carried out for 20 mins., it being stopped by the addition of a few mls. of ethanol to the reaction solution.

The final solution is coagulated by pouring it, with vigorous stirring, into a vessel containing ethanol and acetone in equal proportions and 10% of hydrochloric acid.

From the coagulating bath there is obtained an amber colored elastomer having the aspect of uncured rubber.

It is purified by dissolving it in toluene, after having added to the solvent 0.5 gr. of beta-naphthylamine, and subsequent precipitation from ethanol. After drying in an oven under vacuum at 50° C., the product obtained weighs 5.1 grs. When examined with X-rays it proves to be essentially amorphous and the determination of the intrinsic viscosity, performed in tetrahydronaphthalene at 135° C., gives [$\eta$]=1.59 dl./gr. The evaluation of the ethylene contents indicates that the elastomer fabricated contains about 46% ethylene in moles. The infrared spectrum of the products shows bands in the absorption region $\delta$=CH outside the plane of th ecyclo-olefins, where the monomer has very intense bands; typical absorptions can be observed at 14.2 and 14.85 microns. Also the N.M.R. spectrum shows a peak at 1.3 p.p.m. which can be attributed to the isopropylidene methyl radicals.

A fraction of the elastomer produced has been subjected to cure according to the following compound formulation:

Terpolymer _____ parts__ 100
Stearic acid _____ do____ 0.5
ZnO _____ do____ 5
Sulfur _____ do____ 2
2-mercaptobenzthiazole _____ do____ 1
Tetramethyl-thiuram disulphide _____ do____ 2
Curing temperature _____ ° C__ 175
Curing time _____ mins__ 20

The determination of a few mechanical properties of the vulcanized product has been the following results:

Modulus at 100% elongation _____ kgs./sq. cm__ 20
Tensile strength _____ kgs./sq. cm__ 29
Elongation at break _____ percent__ 271
Permanent set after breaking _____ do____ 8

Example 2

The preceding example is repeated, the only difference being that the working temperature is —20° C. After 20 mins. polymerization there are obtained 7.9 grs. of an elastomer which is totally amorphous when examined with X rays and has [$\eta$]=2.2 dl./gr. The ethylene content in terms of mols. is about 35%.

After vulcanization according to the mix formulation of Example 1 the following results are obtained:

Modulus at 100% elongation _____ kgs./sq. cm__ 10
Tensile strength _____ kgs./sq. cm__ 20
Elongation at break _____ percent__ 291
Permanent set after break _____ do____ 4

Example 3

The procedure is as in the preceding example, except that 44.0 millimoles per liter of 1-isopropylidene-4,7,7a,-3a-tetrahydroindene and a molar ratio propylene to ethylene of 0.9 to 1 are adopted. After 5 mins. polymerization there are obtained 12.5 grs. of an elastomer which is amorphous at X-ray examination and has a [$\eta$]=2.74 dl./gr. The ethylene contents in terms of mols. is about 52%.

After a vulcanization according to the procedure indicated in Example 1 the following results are obtained:

Modulus at 300% elongation _____kgs./sq. cm__ 22
Tensile strength _____kgs./sq. cm__ 39
Elongation at break _____percent__ 445
Permanent set after break _____do____ 17

Example 4

The preceding example is repeated with the only exception that there is employed 5 mls. of a reaction mixture of butadiene and 6,6'-dimethyl fulvene, essentially consisting of 1-isopropylidene-4,7,7a,3a-tetrahydroidene, bis - (3,7)-isopropylidene-dicyclopentadiene - 1,9 and 4-vinyl-cyclohexene-1.

After 3 mins. polymerization there are obtained 13.9 grs. of an elastomer which is totally amorphous at X-ray examination and has [η]=1.63 dl./gr. The ethylene content in terms of mols. is about 35%.

Upon vulcanization according to the compound formulation of Example 1, the following results are obtained:

Modulus at 300% elongation _____kgs./sq. cm__ 12
Tensile strength _____kgs./sq. cm__ 27
Elongation at break _____percent__ 610
Permanent set after break _____do____ 19

Example 5

The apparatus and the precedure described in Example 1 are adopted, by charging the reactor kept at −20° C. with 400 mls. of anhydrous n-heptane, 15 millimoles per liter of Al(iso—C$_4$H$_9$)$_3$, 44.0 milimoles per liter of 1-isopropylidene-4,7,7a,3a-tetrahydroindene, 5 millimoles per liter of VOCl$_3$, and employing a gaseous stream of propylene-ethylene having a molar ratio 3.0 to 1.

After 10 mins, polymerization there are obtained 5.6 grs. of an elastomer which is essentially amorphous at X-ray examination and has [η]=3.44 dl./gr. and exhibits an ethylene content in terms of mols. of about 48%.

After vulcanization according to the procedure set forth in Example 1 the following results are obtained:

Modulus at 300% elongation _____kgs./sq. cm__ 23
Tensile strength _____kgs./sq. cm__ 72
Elongation at break _____percent__ 620

Example 6

According to the procedure set forth in Example 1 there are introduced into the reactor kept at −20° C.: 350 mls. of n-heptane, and 44.0 mililmoles per liter of 1-isopropylidene - 4,7,7a,3a - tetrahydroindene which are saturated with a mixture of propylene and ethylene having a molar ratio of 2.5 to 1. In a separate reactor, 10 millimoles of Al(C$_2$H$_5$)$_2$Cl and 2 millimoles of VCl$_4$ are caused to interact in 50 mls. of n-heptane, kept at −20° C., for a period of 15 mins.

The catalyst solution is siphoned, under a nitrogen stream, into the reactor, the polymerization being carried on for 10 mins.; there are thus recovered 6.9 grs. of an elastomer which is totally amorphous at X-ray examination and exhibits an ethylene content, in terms of mols., of about 35%. The intrinsic viscosity measurements give [η]=2.01 dl./gr.

Upon curing, the following results are obtained:

Modulus at 100% elongation _____kgs./sq. cm__ 14
Tensile strength _____kgs./sq. cm__ 29
Elongation at break _____percent__ 279
Permanent set after break _____do____ 8

Example 7

The procedure set forth in the preceding example is adopted by employing a propylene-ethylene mixture having a molar ratio of 1.7 to 1, 44.0 millimoles per liter of 1-isopropylidene - 4,7,7a,3a - tetrahydroindene and preforming in 50 mls. toluene the catalyst system consisting of 0.85 millimoles of V(C$_5$H$_7$O$_2$)$_3$ and 4.3 millimoles of Al(C$_2$H$_2$)$_2$ Cl. After 15 mins., polymerization there are obtained 2.9 grs. of an elastomer which is totally amorphous at X-ray examination and which exhibits an ethylene content, in terms of mols., of about 70%, while [η] is 2.82 dl./gr. The cure of an elastomer sample, effected according to the compound formulation of Example 1, permits of performing the following measurements:

Modulus at 300% elongation _____kgs./sq. cm__ 49
Tensile strength _____kgs./sq. cm__ 53
Elongation at break _____percent__ 470
Permanent set after break _____do____ 6

Example 8

The preceding example is repeated with the only exception that there are employed 22.0 mmols. per liter of 1 - isopropylidene-4,7,7a,3a-tetrahydroindene. After 30 mins. polymerization there are obtained 7.9 grs. of an elastomer which is totally amorphous at X-ray examination and which exhibits [η]=3.27 dl./gr. and an ethylene content, in terms of mols., of about 65%. Upon cure according to the mix formulation of Example 1, the following results are obtained:

Modulus at 300% elongation _____kgs./sq. cm__ 23
Tensile strength _____kgs./sq. cm__ 37
Elongation at break _____percent__ 437
Permanent set after break _____do____ 8

Example 9

The apparatus described in Example 1 is adopted, keeping it at 0.° C. and, using the same procedure, the reactor is charged with 360 mls. n-heptane, 44.0 millimoles per liter of 1-isopropylidene-4,7,7a,3a-tetrahydroindene, 3 millimoles of Al(C$_2$H$_5$)Cl$_2$ while saturating the solvent with a mixture of propylene and ethylene having a molar ratio of 2.0 to 1. The polymerization is primed by adding simultaneously and continually throughout the whole reaction time, 2 millimoles of VCl$_4$ and 7 millimoles of Al(C$_2$H$_5$)Cl$_2$, each dissolved in 20 mls. n-heptane.

After 27 mins. polymerization there are obtained 13.2 grs. of an elastomer which is essentially amorphous at X-ray examination and exhibits an [η]=3.95 dl./gr. and an ethylene content, in terms of mols., of 44%.

After vulcanization according to the mix formulation of Example 1 the following results are obtained:

Modulus at 100% elongation _____kgs./sq. cm__ 21
Tensile strength _____kgs./sq. cm__ 51
Elongation at break _____percent__ 308
Permanent set after break _____do____ 4

Example 10

The same procedure of the preceding example is adopted with the only exception that the working temperature is −20° C. and that there is employed a catalyst system consisting of: 7 millimoles per liter of

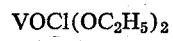
VOCl(OC$_2$H$_5$)$_2$ and 35 millimoles per liter of Al(C$_2$H$_5$)$_2$Cl. Before dropping the components of the catalyst system, throughout the whole polymerization time, there are introduced in the 360 mls. of n-heptane, 19.7 millimoles per liter of Al(C$_2$H$_5$)$_2$Cl.

After 20 mins. polymerization there are obtained 11.2 grs. of an elastomer which is amorphous at X-ray examination and exhibits [η]=1.02 dl./gr. and an ethylene content, in terms of mols., of about 61%.

After curing according to the procedure of Example 1, the following results are obtained:

Modulus at 300% elongation _____kgs./sq. cm__ 15
Tensile strength _____kgs./sq. cm__ 20
Elongation at break _____percent__ 360
Permanent set after break _____do____ 4

Example 11

By operating with the apparatus described in Example 1, kept at −20° C., and with the same method, the reactor is charged with 400 mls. toluene, 44.0 millimoles per liter of 1-isopropylidene-4,7,7a,3a-tetrahydroindene, 5 millimoles per liter of $Al(C_2H_5)_2Cl$, and 2 millimoles of $VCl_3 \cdot 3(C_4H_8O)$; and a gaseous stream of ethylene/propylene having a molar ratio of 1 to 1.7 is employed. After 10 mins. polymerization there are obtained 8.4 grs. of an elastomer which is essentially amorphous at X-ray examination and exhibits an $[\eta]=1.19$ dl./gr. and an ethylene content, in terms of mols., of about 62%.

Upon vulcanization according to the mix formulation of Example 1 the following results are obtained:

Modulus at 100% elongation _____kgs./sq. cm__ 9
Tensile strength _____kgs./sq. cm__ 25
Elongation at break _____percent__ 420
Permanent set after break _____do____ 8

Example 12

The apparatus set forth in Example 1 is employed and kept at −20° C., and with the same procedure the reactor is charged with 400 mls. toluene, 88.0 millimoles per liter of 1-isopropylidene-4,7,7a,3a-tetrahydroindene, 22.7 millimoles per liter of $LiAl(n-C_8H_{17})_4$, 15.9 millimoles per liter of $TiCl_4$ and there is employed a gaseous stream of propylene/ethylene having a molar ratio of 2.5 to 1.

After 10 mins. reaction there are obtained 10.2 grs. of an elastomer which is essentially amorphous at X-ray examination and exhibits $[\eta]=2.56$ dl./gr. and an ethylene content, in terms of mols., of about 53%. Upon curing the following data have been obtained:

Modulus at 300% elongation _____kgs./sq. cm__ 7
Tensile strength _____kgs./sq. cm__ 17
Elongation at break _____percent__ 790

Example 13

In a way quite similar to that described in Example 1, the reactor, maintained at −20° C., is charged with 400 mls. of n-heptane, 22.0 millimoles per liter of 1-isopropylidene-4,7,7a,3a-tetrahydroindene, 15 millimoles per liter of $AlHClN(CH_3)_2$, 10 millimoles per liter of $VCl_4$ and a gaseous stream of propylene and ethylene having a molar ratio 2.5 to 1. After 15 mins. polymerization, there are obtained 10.8 grs. of an elastomer which is essentially amorphous at X-ray examination and exhibits $[\eta]=2.0$ dl./gr., while the ethylene content, in terms of mols., is about 42%.

Upon vulcanization according to the specifications set forth in Example 1, the following results are obtained:

Modulus at 300% elongation _____kgs./sq. cm__ 27.6
Tensile strength _____kgs./sq. cm__ 38.2
Elongation at break _____percent__ 530
Permanent set after break _____do____ 19

Example 14

The reactor, maintained at −20° C., and which is a part of the implementation described in Example 1 is charged, with the usual method, with 400 mls. of n-heptane, 44.0 millimoles per liter of 1-isopropylidene-bicyclo-(4,4,0)-decadiene-2.6); 25.0 millimoles per liter of $AlHCl_2O(C_2H_5)_2$, 10.0 millimoles per liter of $VCl_4$ while simultaneously blowing a gaseous mixture propylene/ethylene having a molar ratio of 2.5 to 1.

After 15 mins. polymerization, there are obtained 8.3 grs. of an elastomer which is amorphous at X-ray examination and exhibits $[\eta]=2.01$ dl./gr., while the ethylene content, in terms of mols., is 40%. The infrared spectrum of the obtained polymer shows bands in the region of the absorptions 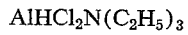 outside the plane of the cyclo-olefins where the monomer has very intense bands: typical absorptions can be observed at 14.2 and 14.85 microns. Also the N.M.R. spectrum shows a peak at 1.3 p.p.m. which can be attributed to the isopropylidenic methyl groupings.

Mechanical measurements effected on a vulcanized sample have given the following results:

Modulus at 300% elongation _____kgs./sq. cm__ 15
Tensile strength _____kgs./sq. cm__ 32
Elongation at break _____percent__ 725

Example 15

By employing the usual apparatus at −20° C., there are employed 400 mls. of n-heptane, a gaseous mixture of propylene and ethylene having a molar ratio of 2.5 to 1, 29.5 millimoles per liter of 2-isopropylidene-bicyclo-(4.4.0)-decadiene-3,6,15 millimoles per liter of $$AlHCl_2N(C_2H_5)_3$$

10 millimoles per liter of $VCl_4$. After 20 mins. reaction, there are obtained 8.1 grs. of an elastomer which is essentially amorphous at X-ray examination and exhibits $[\eta]=2.54$ dr./gr. and an ethylene content, in terms of mols., of 43%.

The mechanical measurements give, after the vulcanization, the following results:

Modulus at 300% elongation _____kgs./sq. cm__ 16
Tensile strength _____kgs./sq. cm__ 28
Elongation at break _____percent__ 780

Example 16

Similarly to what has been described in Example 1, the reactor, maintained at −20° C., is charged with 400 mls. of n-heptane, 13.5 millimoles per liter of $$AlHBrN(CH_3)_2$$

44.0 millimoles per liter of 1-isopropylidene-4-methyl-bicyclo (4.3.0)-nonadiene-2,5,7,5-millimoles per liter of $VCl_4$, employing a gaseous mixture of propylene and ethylene having a molar ratio of 2.0 to 1. After 15 mins. polymerization there are obtained 6.1 grs. of an elastomer which is essentially amorphous at X-ray examination and exhibits $[\eta]=3.15$ dl./gr. and an ethylene content in terms of mols. of 62%. The mechanical measurements after cure give the following results:

Modulus at 300% elongation _____kgs./sq. cm__ 26
Tensile strength _____kgs./sq. cm__ 54
Elongation at break _____percent__ 620

Example 17

According to the procedure described in Example 1 the reactor, thermostatically maintained at −20° C., is charged with 400 mls. of n-heptane, 60 millimoles per liter of $H_2AlN(CH_3)_2$, 44.0 millimoles per liter of 3-isopropylidene-5,8 dimethyl-bicyclo-(4.4.0)-decadiene-4,6, 7.5 millimoles per liter of $VCl_4$, employing a gaseous stream of propylene/ethylene having a molar ratio of 2.5 to 1.

After 15 mins. polymerization, there are obtained 4.2 grs. of an elastomer which exhibits $[\eta]=3.34$ dl./gr. and an ethylene content, in terms of mols., of about 57%.

The measurements of a few mechanical properties, effected on a vulcanized sample according to the compound formulation of Example 1, give the following results:

Modulus at 300% elongation_____kgs./sq. cm__ 24
Tensile strength _____kgs./sq. cm__ 58
Elongation at break _____percent__ 700

Example 18

In the apparatus described in Example 1, having the reactor thermostatically maintained at −20° C., there are introduced 400 mls. of n-heptane, 15 millimoles per liter of $Al(n-C_{10}-H_{21})_3$, 0.139 mols. per liter of 1(1′-penyl)-ethylidene-4,7,a,3a-tetrahydroindene, 5 millimoles per liter of $VCl_4$, by employing a gaseous stream propylene/ethylene having a molar ratio of 2.5 to 1.

After 15 mins. polymerization there are obtained 5 grs. of an elastomer which is completely amorphous at X-ray examination and exhibits [η]=1.86 dl./gr. and an ethylene content in terms of mols. of 39%.

The infrared spectrum of the obtained polymer shows bands in the region of absorption δ=C—H outside the plane of the cyclo-olefins where the monomer has very intense bands: typical absorptions can be observed at 14.2, 14.85 and 14.35 microns.

Upon curing according to the formulation of Example 1, the following results have been obtained:

Modulus at 300% elongation _____kgs./sq. cm__ 24.7
Tensile strength _____kgs./sq. cm__ 29.5
Elongation at break _____percent__ 340
Permanent set after break _____do____ 4

Example 19

The preceding example is repeated with the only exception that there are employed 58.0 millimoles per liter of 1(1'-phenyl)-ethylidene-4,7,7a,3a-tetrahydroindene and a mixture propylene/ethylene having a molar ratio of 0.9 to 1 is employed.

After 7 mins. polymerization there are obtained 15.2 grs. of an elastomer which is totally amorphous at X-ray examination and exhibits [η]=2.10 dl./gr. and a content of ethylene, in terms of mols., of 46%.

After curing according to the compound formula of Example 1, the following results are obtained:

Modulus at 300% elongation _____kgs./sq. cm__ 16
Tensile strength _____kgs./sq. cm__ 32
Elongation at break _____percent__ 571
Permanent set after break _____do____ 15

Example 20

By operating along the lines of Example 1, the reactor, maintained at −20° C., is charged with 400 mls. of n-heptane, 18 millimoles per liter of AlHBrN(CH$_3$)$_2$, 58 millimoles per liter of 1(1'phenyl)-ethylidene-4,7,7a,3a-tetrahydroindene, 10 millimoles per liter of VCl$_4$ and a mixture of propylene and ethylene having a molar ratio of 2.0 to 1 is used. After 20 mins. polymerization there are obtained 7.4 grs. of an elastomer which is essentially amorphous at X-ray examination and exhibits [η]=2.12 dl./gr. and a content of ethylene, in terms of mols., of 56%. The infrared spectrum of the obtained polymer shows bands in the region of absorptions δ=C—H outside the plane of the cyclo-olefins where the monomer has very intense bands: typical absorptions can be observed at 14.2, 14.85 and 14.35 microns.

After curing according to the compound formula of Example 1, the following results are obtained:

Modules at 300% elongation _____kgs./sq. cm__ 11
Tensile strength _____kgs./sq. cm__ 27
Elongation at break _____percent__ 780

Example 21

Similarly to what has been described in the preceding example, there are employed 400 mls. of n-heptane 8 millimoles per liter of AlH$_2$N(CH$_3$)$_2$, 10 mls. per liter of a mixture of reaction of butadiene and 6-methyl-6-phenyl fulvene, essentially consisting of 1(1'-phenyl)-ethylidine-4,7,7a,3a-tetrahydroindene, 4-vinylcylohexene-1, and bis-[(3,7)(1'-phenyl)-ethylidene]-bicyclopentadiene-1,9, 10 millimoles per liter of VCl$_4$ and a mixture of propylene and ethylene having a molar ratio of 2.5 to 1. After 20 mins. polymerization, there are obtained 5.1 grs. of an elastomer which is essentially amorphous at X-ray examination and exhibits [η]=2.05 dl./gr. and an ethylene content in terms of mols. of 52%.

Upon curing according to the compound formulation of Example 1, the following results are obtained:

Modulus at 300% elongation _____kgs./sq. cm__ 12
Tensile strength _____kgs./sq. cm__ 35
Elongation at break _____percent__ 740

The embodiments of the invention in which an exclusive property or privilege is claimed are defined as follows:

1. Sulfur-curable amorphous linear polymers comprising
   propylene and ethylene in a molar ratio ranging from 0.9 to 1 to 3.0 to 1
   an orthocondensed polycyclic polyene containing at least an alkylidene substituent conjugated with a double bond which is part of the cyclic ring and selected from the group consisting of
      1-isopropylidene-4,7,7a,3a-tetrahydroindene;
      1-isopropylidene-4-methyl-4,7,7a,3a-tetrahydroindene;
      1-(1'-phenyl)-ethylidene-4,7,7a,3a-tetrahydroindene;
      1-isopropylidene-bicyclo-(4.4.0)-decadiene-2,6;
      2-isopropylidene-bicyclo-(4.4.0)-decadiene-3,6;
      1-isopropylidene-4-methyl-bicyclo-(4.3.0) nonadiene-2,5;
      3-isopropylidene-8-methyl-bicyclo-(4.4.0)-decadiene-4,6;
      3-isopropylidene-5,8-dimethyl-bicyclo-(4.4.0)-decadiene-4,6;
   a reaction mixture of butadiene and 6,6'-dimethyl fulvene, essentially consisting of (a) 1-isopropylidene-4,7,7a,3a-tetrahydroindene, (b) bis-(3,7)-isopropylidene-dicyclopentadiene-1,9, and (c) 4-vinyl-cyclohexene-1;
   a reaction mixture of butadiene and 6-methyl-6-phenyl fulvene essentially consisting of (a) 1(1'-phenyl)-ethylidene-4,7,7a,3a-tetrahydroindene, (b) 4-vinyl-cyclohexene-1, and (c) bis {(3,7)(1-phenyl)-ethylidene}-bicyclopentadiene-1,9;
   a reaction mixture of (a) 1-isopropylidene-4,7,7a,3a-tetrahydroindene, (b) 4-vinyl-cyclo-hexene-1, and (c) bis-(1–10) isopropylidene-bicyclopentadiene-2,5;
   a reaction mixture of a conjugated polyene selected from the group consisting of (a) butadiene, (b) 2,3-dimethylbutadiene, (c) isoprene, (d) piperylene and (e) 1,3-hexadiene, and of a monomer selected from the group consisting of (a) 3-isopropylidene cyclohexadiene-1,4 and its alkyl substituted derivatives and
   wherein the amount of the ortho-condensed polycyclic polyene is between 1% and 10% by weight of the polymer.

2. Curable unsaturated amorphous linear terpolymers according to claim 1, wherein the polyene monomer is 1-isopropylidene-4,7,7a,3a-tetrahydroindene.

3. Curable amorphous linear terpolymers according to claim 1 wherein the polyene monomer is 1-isopropylidene-4-methyl-4,7,7a,3a-tetrahydroindene.

4. Curable amorphous linear terpolymers according to claim 1 wherein the polyene monomer is 1(1'-phenyl)-ethylidene-4,7,7a,3a-tetrahydroindene.

5. Curable amorphous linear terepolymers according to claim 1, wherein the polyene component is formed by a mixture comprising 1-isopropylidene-4,7,7a,3a-tetrahydroindene, 4-vinyl-cyclohexene-1, and bis-(1–10) isopropylidene-bicyclopentadiene-2,5.

6. Elastomers obtained by sulfur-curing polymers according to claim 1, and having a viscosity between 1.02 dl./gr. and 3.95 dl./gr.

7. A process for the preparation of polymers comprising
   introducing a gaseous mixture of ethylene and propylene in a molar ratio ranging from 1 to 0.9 to 1 to 3.00 into a solvent, and introducing into the mixture in solution an orthocondensed polycyclic polyene selected from the group consisting of
  1-isopropylidene-4,7,7a,3a-tetrahydroindene;
  1-isoproylidene-4-methyl-4-7,7a,3a-tetrahydroindene;
  1-(1'-phenyl)-ethylidene-4,7,7a,3a-tetrahydroindene;
  1-isopropylidene-bicyclo-(4.4.0)-decadiene-2,6;
  2-isopropylidene-bicyclo-(4.4.0)-decadiene-3,6;
  1-isopropylidene-4-methyl-bicyclo-(4.3.0) nonadiene-2,5;
  3-isopropylidene-8-methyl-bicyclo-(4.4.0)-decadiene-4,6;
  3-isopropylidene-5,8 dimethyl-bicyclo-(4.4.0)-decadiene-4,6;
a reaction mixture of butadiene and 6,6'-dimethyl fulvene, essentially consisting of (a) 1-isopropylidene-4,7,7a,3a-tetrahydroindene, (b) bis-(3,7)-isopropylidenedicyclopentadiene-1,9 and (c) 4-vinylcyclohexene-1;
a reaction mixture of butadiene and 6-methyl-6-phenyl fulvene essentially consisting of (a) 1(1'-phenyl)-ethylidene-4,7,7a,3a-tetrahydroindene, (b) 4-vinylcyclohexene-1, and (c) bis {(3,7) (1'-phenyl)-ethylidene}-bicyclopentadiene-1,9;
a reaction mixture of (a) 1-isopropylidene-4,7,7a,3a-tetrahydroindene, (b) 4-vinyl-cyclo-hexene-1, and (c) bis-(1–10) isopropylidene - bicyclopentadiene-2, 5, and;
a reaction mixture of a conjugated polyene selected from the group consisting of (a) butadiene, (b) 2,3-dimethylbutadiene, (c) isoprene, (d) piperylene and (e) 1,3-hexadiene, and of a monomer selected from the group consisting of 3-isopropylidene cyclohexadiene-1,4, and its alkyl substituted derivatives in the presence of a catalytic system consisting of a transition metal selected from the IV and V group of the Periodic Table and of an aluminum compound having the general formula Al—R—X—Y wherein R is an alkyl radical of from 1 to 12 carbon atoms, or a hydrogen atom, X and Y are equal or different, and can be hydrogen, an alkyl radical of from 1 to 12 carbon atoms, halogens or residues of secondary amines.

8. A process according to claim 7 wherein the catalyst system is formed by a derivative of a transition metal of the IV and V Group of the Periodic Table and by an aluminum compound of the formula Me—Al—R$_4$, wherein Me is an alkali metal and R is an alkyl radical of from 1 to 12 carbon atoms, or a hydrogen atom.

9. A process according to claim 8 wherein the aluminum compound is selected among:

Al(n-C$_{10}$H$_{21}$)$_3$        Al(n-C$_6$H$_{13}$)$_3$
Al(i-C$_4$H$_9$)$_3$              AlCl$_2$(C$_2$H$_5$)
Al(C$_2$H$_5$)$_2$Cl              Al(i-C$_4$H$_9$)$_2$Cl
Al(i-C$_4$H$_9$)Cl$_2$            AlHCl$_2$.O(C$_2$H$_5$)$_2$
AlH$_2$N(CH$_3$)$_2$              AlHClN(CH$_3$)$_2$
AlH$_3$.N(CH$_3$)$_3$             LiAl(n-C$_8$H$_{17}$)$_4$

10. A process according to claim 7 wherein the working temperatures are between −30° C. and +40° C.

11. A process according to claim 10 wherein the working pressures are between 1 and 50 atmospheres.

References Cited
UNITED STATES PATENTS 2,898,325  8/1959  Fusco et al. _____ 260—82
3,313,786  4/1967  Kahle et al. _____ 260—79.5

JOSEPH L. SCHOFER, Primary Examiner
ROGER S. BENJAMIN, Assistant Examiner

U.S. Cl. X.R.
260—80.7, 80.78